US007018087B2

(12) United States Patent
Yoo

(10) Patent No.: US 7,018,087 B2
(45) Date of Patent: Mar. 28, 2006

(54) LIGHT GUIDE PANEL WITH SLANTED LIGHT GUIDING PARTS

(75) Inventor: Tae Kun Yoo, Goyang (KR)

(73) Assignee: Fawoo Technology Co., Ltd., Kyunggi Do (KR)

( * ) Notice: Subject to any disclaimer, the term of this patent is extended or adjusted under 35 U.S.C. 154(b) by 128 days.

(21) Appl. No.: 10/642,770

(22) Filed: Aug. 18, 2003

(65) Prior Publication Data

US 2004/0150980 A1    Aug. 5, 2004

(30) Foreign Application Priority Data

Feb. 4, 2003    (KR)    ...................... 10-2003-0007033

(51) Int. Cl.
*F21V 7/04*    (2006.01)
(52) U.S. Cl. ........................ 362/615; 362/621; 362/610
(58) Field of Classification Search .................. 362/31, 362/26, 561, 560, 558, 27, 330, 50, 615, 362/621, 628, 608, 610; 385/50
See application file for complete search history.

(56) References Cited

U.S. PATENT DOCUMENTS 3,328,570 A * 6/1967 Balchunas .................. 362/615
5,190,365 A * 3/1993 Cordy, Jr. .................... 362/26
5,711,592 A * 1/1998 Hotta .......................... 362/496

\* cited by examiner

*Primary Examiner*—John Anthony Ward
*Assistant Examiner*—Bao Q. Truong
(74) *Attorney, Agent, or Firm*—Madson & Austin

(57) ABSTRACT

The present invention provides a light guide panel with one or more slanted light guiding parts for backlight units for liquid crystal display (LCD) and for advertisement or illumination, wherein the slanted light guiding part is provided at one side end of the light guide panel, with its one end adjacent to a light source being thicker than the other end adjacent to the light guide panel, to have a slope in which the light emitted from the light source can be totally internal-reflected in the light guide panel, so that the brightness can be maximized and the volume and weight of the light guide panel can be reduced to facilitate its handling and installation, thus resulting in significant reduction of manufacturing expenses.

13 Claims, 7 Drawing Sheets

c)
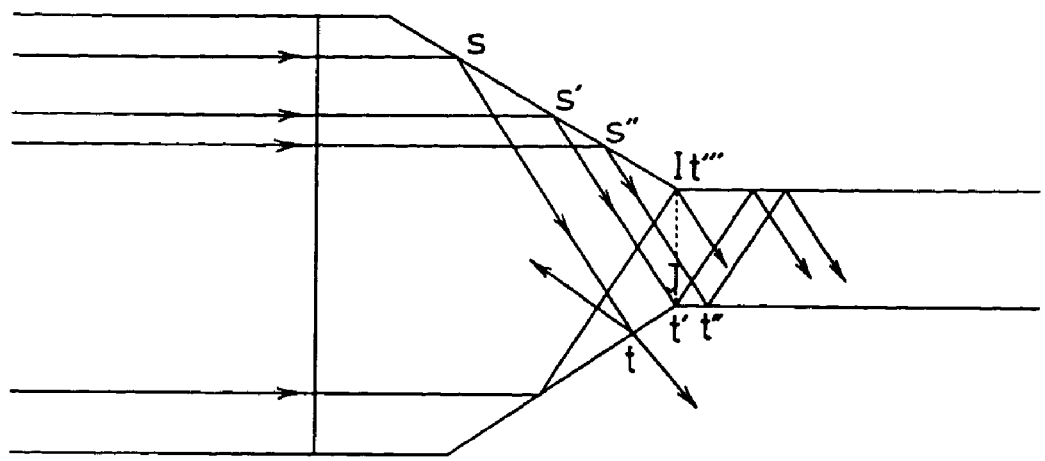
d)
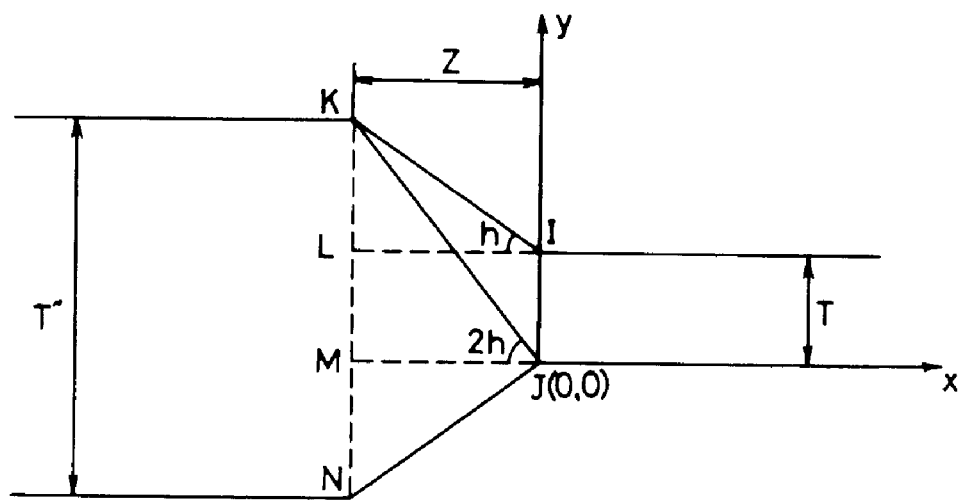

LIGHT GUIDE PANEL WITH SLANTED LIGHT GUIDING PARTS

FIELD OF THE INVENTION

The present invention relates to a light guide panel with slanted light guiding part(s) for backlight units for liquid crystal display (LCD) and for advertisement or illumination, and more particularly to a light guide panel having slanted light guiding part(s), wherein the slanted light guiding part is provided at one side end of the light guide panel, with its one end adjacent to a light source being thicker than the other end adjacent to the light guide panel, to have a slope in which the light emitted from the light source can be totally internal-reflected in the light guide panel, so that the brightness can be maximized and the volume and weight of the light guide panel can be reduced to facilitate its handling and installation, thus resulting in reduced manufacturing expenses.

BACKGROUND OF THE INVENTION

In general, a backlight unit for LCD and for advertisement or illumination comprises a light guide panel made of a transparent acrylate board. The light guide panel has prominences and depressions in the form of dots or grooves on one side thereof to induce refraction and scattering of light, and a light source provided at one side end of the light guide panel.

FIG. 1 is a rear view of a backlight unit (100) according to the conventional technology, and FIG. 2 is a partial sectional view of FIG. 1 along the line A—A.

Referring to FIGS. 1 and 2, a light source (120) for radiating light is provided at one side end of a light guide panel (110). The light guide panel (110) is made of translucent material, and its front side has a display film (140) attached thereto, while its backside is provided with a plurality of horizontal and vertical V-shaped grooves (112) to uniformly scatter and refract the light emitted from the light source to the front side and is covered with a reflection sheet (150), such as polyethyleneterephthalate (PET) material.

On the backside of the conventional light guide panel (110), the intervals between two adjacent lines of the V-shaped grooves (112) gradually become narrow in order to obtain uniform brightness through the light guide panel (110). This is because the closer to the light source (120), the less the light is lost during the course of transmission. That is, since the light from the light source (120) is not lost as readily when it is closer to the light source (120), the V-shaped grooves (112) near the light source (120) can be arranged at broader intervals than the V-shaped grooves (112) distant from the light source (120). If the size of the light guide panel (110) increases, the size of the light source (120) must also be increased to maintain a certain brightness.

Another conventional light guide panel is manufactured by coating an acrylate board with light diffusing material without V-shaped grooves or prominences and depressions in the form of dots. This is focused on mass-production in lower cost, rather than on provision of uniform brightness. Accordingly, the closer to the light source, the brighter it is, while the more distant from the light source, the darker it is. In this case also, if the size of the light guide panel increases, the size of the light source must also be increased to maintain a certain brightness.

In the above conventional light guide panels, the thickness of the light guide panel should correspond to the diameter of the light source in order to absorb, refract, and scatter the light emitted from the light source as much as possible. However, although a certain level of brightness can be obtained, the conventional light guide panels have the following disadvantages:

As the width and thickness of the light guide panel must be increased in proportion to the size of the light source, the increased volume and weight of the light guide panel complicate handling and installation, increase manufacturing costs, while the diminishing performance.

As an alternative for these disadvantages, as shown in FIG. 3, reflection sheets (130) were provided to cover the light source (120), and thus the light guide panel (110) having a thickness less than the diameter of the light source (120) has been used. In this case, the light guide panel (110) could be lighter than the above conventional ones and could be easily installed with a lower cost. However, the brightness remarkably deteriorated much more than the case in FIG. 2 where the light guide panel is as thick as the diameter of the light source. Thus, such a light guide panel (110) was mainly used for small-sized advertising boards only.

U.S. Pat. No. 6,068,382 entitled "Panel-Form Illuminating System" illustrates a light guide panel wherein a light radiating part is inclined in the form of stairs to become thinner and thinner as it becomes distant from a light source.

The principle of this US patent is in the stair structure to induce refraction and scattering of light by forming V-shaped grooves and protrusions in the inclined parts of the panel. The thickness of the panel at its both side ends and the degree of inclination focuses on the uniform brightness.

In order to obtain the uniform brightness, however, the panel has to be manufactured by an injection molding, by which the size and use of the panel is to be limited. Therefore, the panel can be used only for light guide panels of notebook computers, and cannot be used for middle or large-sized light guide panels.

Also, the roller pressing renders the production of middle and large-sized panels practically impossible due to the following reasons:

Firstly, the panel must be molded while passing through between two inclined rollers, but it is difficult to supply raw materials of the panel in proportion to its varying thickness.

Secondly, as the light source differs in pattern and slope according to the lightness, the light source is limited.

Thirdly, many rollers are required since the slopes differ depending on the width of the panel.

Fourthly, in order to install the panel on the wall or the plane, it is necessary to fill the difference between the neighboring stairs with supplement.

Currently, light guide panels for LCD monitors and advertising boards are made of mass-productive acrylate boards, which are superior to the above prior technology, for example, by enabling to be cut in various sizes.

SUMMARY OF THE INVENTION

The object of the present invention is to solve the above disadvantages of the conventional light guide panels by providing a light guide panel with slanted light guiding part(s), wherein the slanted light guiding part is provided at one side end of the light guide panel, with its one end adjacent to a light source being thicker than the other end adjacent to the light guide panel, to form an inclination.

Another object of the present invention is to provide a light guide panel with slanted light guiding part(s), wherein the light emitted from the light source can be totally internal-reflected in the light guide panel, so that the brightness can be maximized and the volume and weight of the light guide panel can be reduced to facilitate its handling and installation.

A further object of the present invention is to provide a light guide panel with slanted light guiding part(s), which can be manufactured in much lower costs than the conventional ones.

In order to achieve the above objects, a light guide panel with slanted light guiding part(s) according to the present invention comprises a light guide panel including a light radiating part on its front side to radiate the light emitted from a light source; and a slanted light guiding part provided between the light source and one side end of the light guide panel, wherein the slanted light guiding part forms a slope to the extent that its one end adjacent to the light source is thick enough to cover the diameter of the light source and is thicker than the other end adjacent to the light guide panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, wherein.

DETAILED DESCRIPTION OF THE PREFERRED EMBODIMENTS

Figure 1:
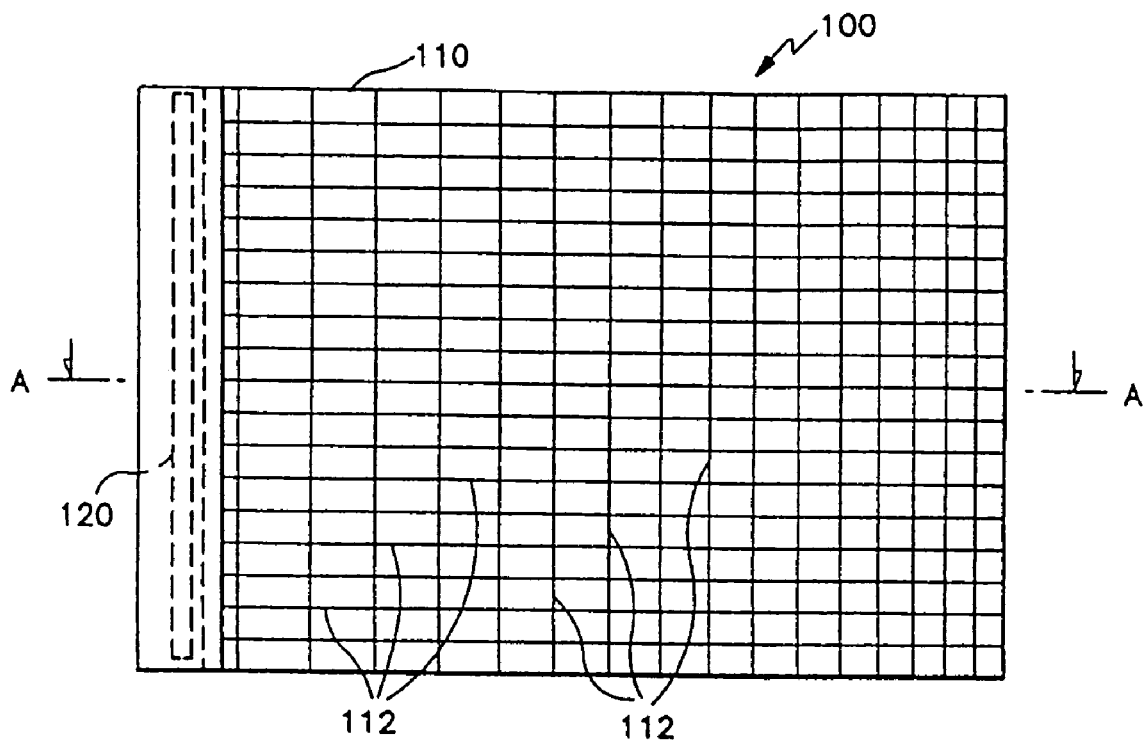
FIG. 1 is a rear view of a backlight unit having a light guide panel according to the prior art.
Figure 2:
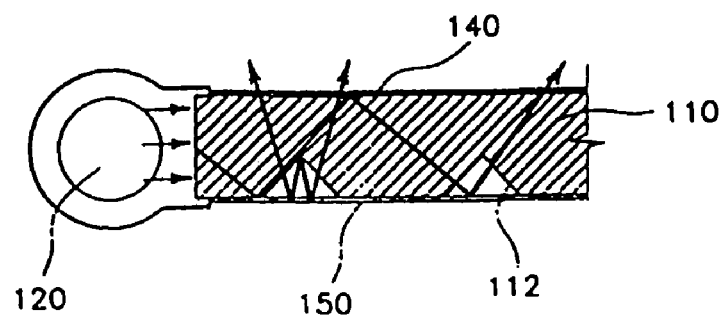
FIG. 2 is a partial sectional view of FIG. 1 along the line A—A.
Figure 3:
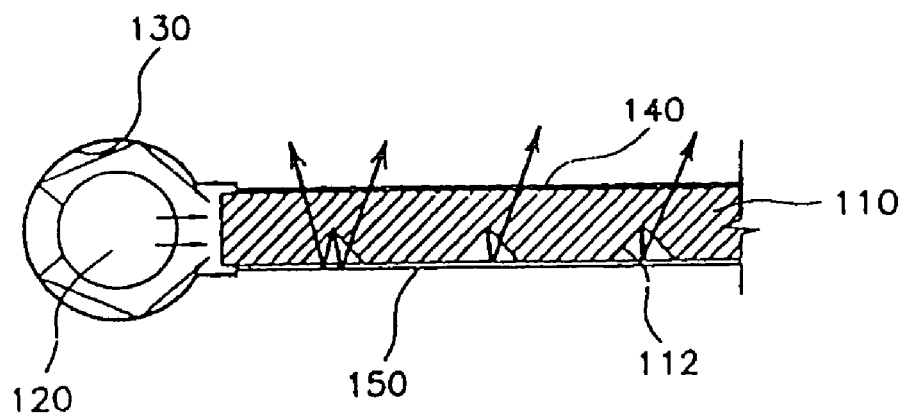
FIG. 3 is a sectional view showing a part of another backlight unit having a light guide panel according to the prior art.
Figure 4:
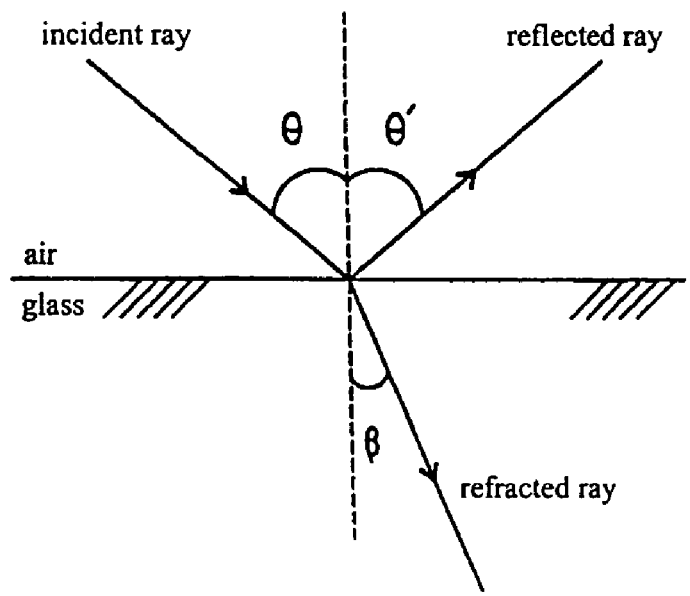
FIG. 4 shows the reflection and refraction of light.

Due to the nature of light propagating in the shortest route, light is reflected and refracted on the boundary between two different media as shown in FIG. 4.

For example, when the light falls on a plane glass surface in the air forming the angle ($\theta$) with the normal to the glass surface, it is reflected by the angle ($\theta'$) which is the same as the angle of incidence ($\theta=\theta'$), and it is refracted according to the following relation:

$$n_1 \times \sin \theta = n_2 \times \sin \beta,$$

wherein $n_1$ and $n_2$ represent the index of refraction of each medium, and angle $\beta$ represents an angle of refraction.

Table 1 shows indexes of refraction of various media (for yellow light ray).

TABLE 1

| medium | Index of refraction |
|---|---|
| vacuum | 1 |
| air | 1.00029 |
| water (20° C.) | 1.33 |
| acetone | 1.36 |
| glass | 1.52 |
| diamond | 2.42 |
| polystyrene | 1.55 |
| acryl | 1.49 |

Refraction of light takes place when the light falls on the boundary surface between two different media having different optical density, since the speed of progress of light is different in each medium.

Figure 5:
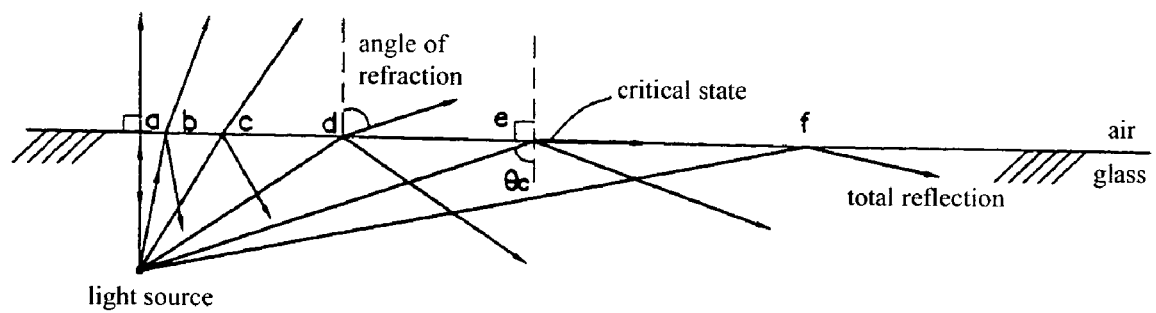
FIG. 5 shows the total reflection of light.

When the light reaches on a boundary plane surface between an optically dense medium and a less optically dense medium, the index of reflection becomes larger, as the difference of optical density between the two media is increased and as the angle of incidence is increased. As shown in FIG. 5, when the light in an optically dense medium (glass) falls on a plane surface on the other side of which is a less optically dense medium (air), since the angle of refraction is always larger than the angle of incidence, if the angle of incidence is increased, a situation is reached at which the refracted ray (e) points along the surface, the angle of refraction being 90°.

For angles of incidence larger than this critical angle $\theta_c$, there is no refracted ray, and we call this situation "total internal reflection".

Assuming that the external material having the lower optical density is air (the index of refraction=1.00029≈1), we obtain the following equation:

$n \times \sin \theta_c = \sin 90° = 1$ ($n$ is the index of refraction of an internal material)

$\theta_c = \sin^{-1}(1/n)$

This is the principle of optical fibers.

Figure 6:
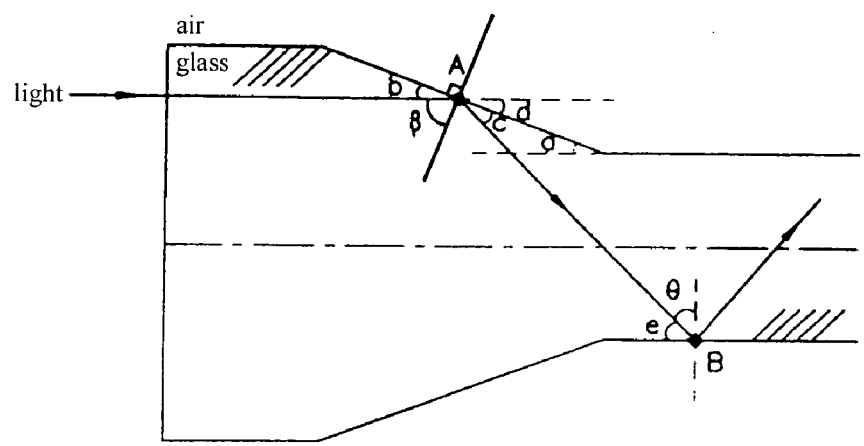
FIG. 6 illustrates the relation of angles of the total reflection.

If the light enters into a medium at an angle larger than the critical angle and if it is totally reflected at the point B according to the same principle of the optical fiber as shown in FIG. 6, the light can be completely locked up in a plate.

In FIG. 6, according to the law of reflection, $\angle b$ is equal to $\angle c$, and the angles $\angle b$, $\angle d$ and $\angle a$ are the same as alternate interior angles or corresponding angles. Thus, the angles a, b, c and d are the same, $\angle a = \angle b = \angle c = \angle d$, and according to the principle of alternate interior angles, $\angle e = \angle c + \angle d = 2\angle a$.

At the point A, since $\angle \beta$ is larger than the critical angle, the total reflection occurs. For the total reflection at the point B, the following condition must be satisfied:

$\theta > \theta_c = \sin^{-1}(1/n)$

Figure 7:
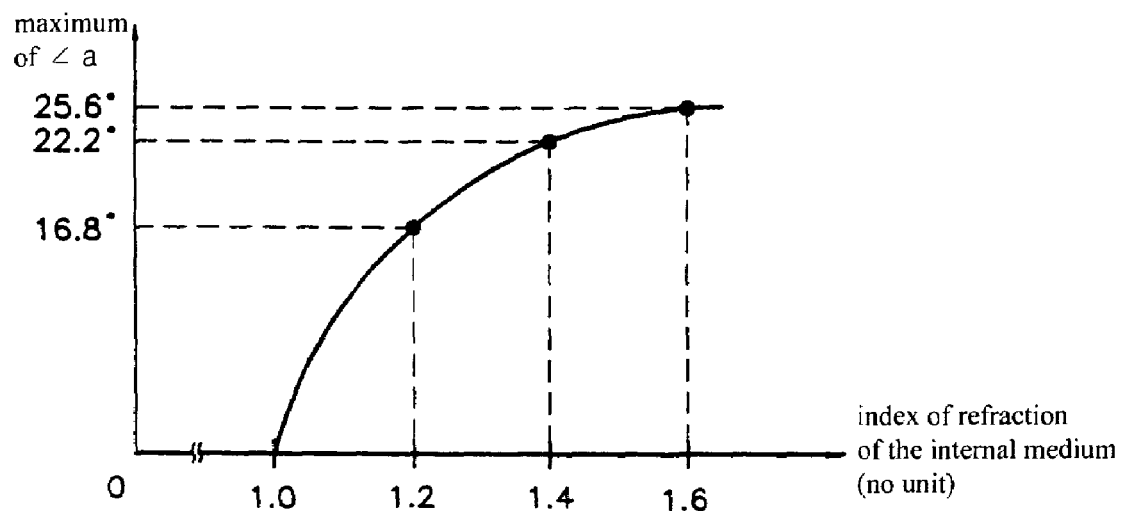
FIG. 7 is a graph showing the relation between the index of refraction and the maximum allowable angle for the total reflection.

Since $\theta + e = 90°$, $\theta = 90° - e = 90° - 2a$ (Refer to the angles in FIG. 6) and $90° - 2a > \theta_c = \sin^{-1}(1/n)$ Therefore, $\angle a < 45° - \frac{1}{2} \sin^{-1}(1/n)$ FIG. 7 is a graph showing the relation between the index of refraction and the maximum allowable angle of $\angle a$ for the total reflection, and Table 2 indicates the maximum allowable angles to confine the light in a plate by the total reflection. In order to confine the light, ∠a must be smaller than these angles.

TABLE 2

| Index of refraction | Maximum allowable angle of ∠ a |
|---|---|
| 1.1 | 12.30° |
| 1.2 | 16.77° |
| 1.3 | 19.86° |
| 1.4 | 22.20° |
| 1.5 | 24.09° |
| 1.6 | 25.66° |
| 1.7 | 26.98° |

A light guide panel with slanted light guiding part(s) according to the present invention adopts the principle of the "total internal reflection" as described above.

Figure 8:
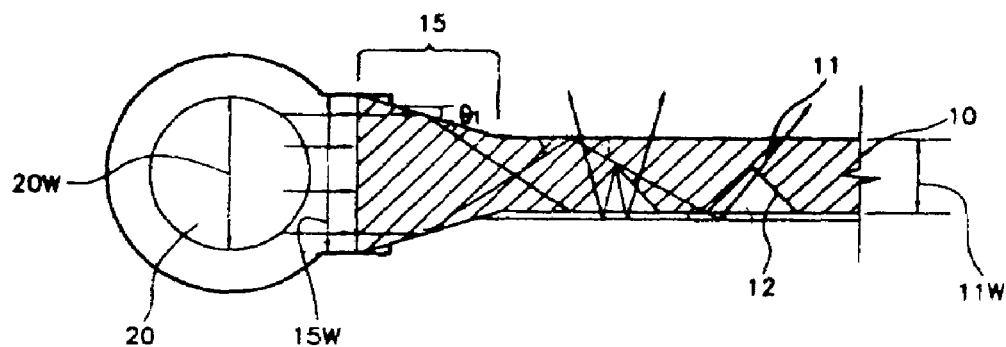
FIG. 8 is a partial sectional view of a light guide panel according to the present invention.

FIG. 8 is a partial sectional view of a light guide panel (10) according to an embodiment of the present invention.

As shown in FIG. 8, a light guide panel with slanted light guiding part(s) according to the present invention comprises a light guide panel (10) including a light radiating part (11) on its front side to radiate the light emitted from a light source (20) and prominences and depressions (12) in the form of dots or grooves on the backside of the light radiating part (11); and a slanted light guiding part (15) provided between the light source (20) and one side end of the light guide panel (10), wherein the slanted light guiding part (15) forms a slope ($\theta_1$) to the extent that its one end adjacent to the light source (20) is thick enough to cover the diameter (20W) of the light source (20) and is thicker than the other end adjacent to the light radiating part (11).

It is preferable that the slope ($\theta_1$) of the light guiding part (15) is below the critical angle according to the index of refraction of each medium, i.e., the maximum allowable angle (∠a) for the total internal reflection.

For example, when the light guiding part (15) is made of acryl, the index of refraction of acryl is 1.49 (in Table 1). When the index of refraction is about 1.5, as the maximum allowable angle is 24.09° (Table 2), the slope ($\theta_1$) is to be formed to be about 24° or below.

If the slope ($\theta_1$) of the light guiding part (15) is more than the critical angle, there will be a partial loss of light. However, in view of the brightness, width and volume of the light guide panel (10), especially the brightness is remarkably efficient, compared to conventional light guide panels having no light guiding part(s).

Accordingly, the slope ($\theta_1$) of the light guiding part (15) can be larger than the critical angle.

Figure 9:
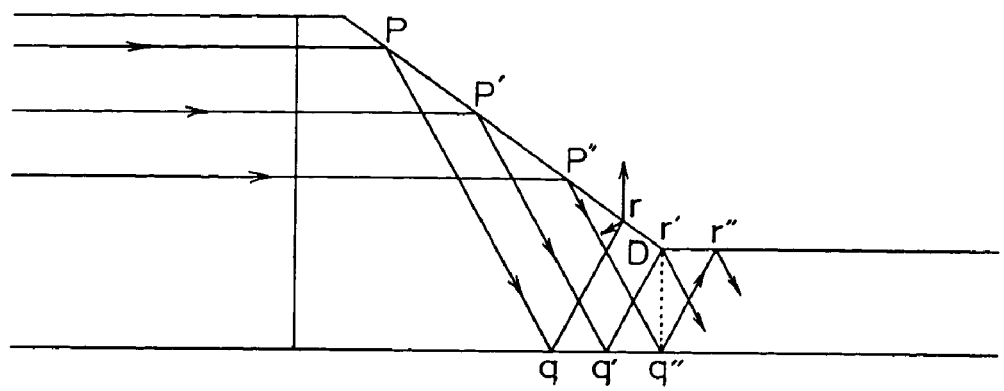
FIGS. 9(a) to (d) are illustrations to obtain the maximum thickness of a light guiding part of the light guide panel according to the present invention.
Figure 9:
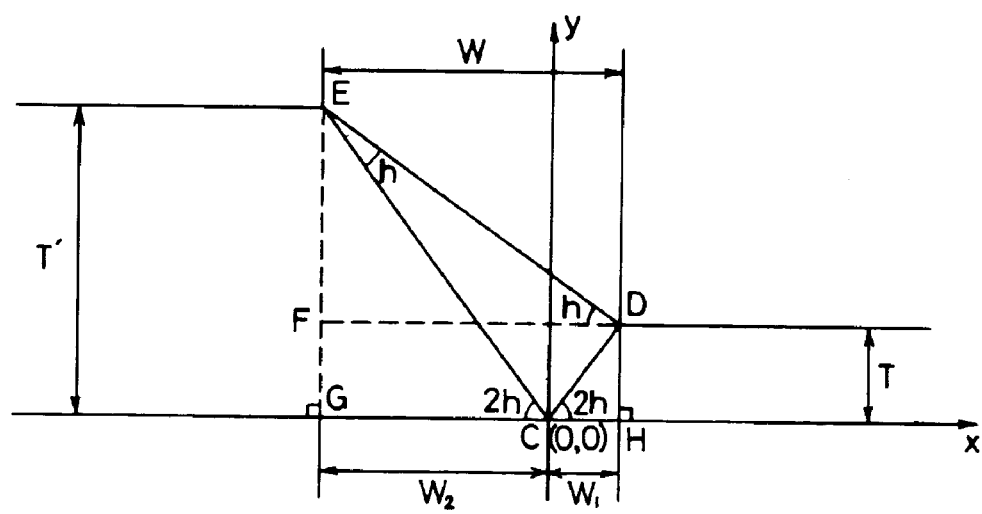

As shown in FIGS. 9(a) to 9(d), the following functional relation exists between the thickness (15W) of the front end of the light guiding part (15) and the thickness (11W) of the light radiating part (11):

Firstly, as shown in FIGS. 9(a) and (b), it is assumed that the light guiding part (15) has only one side slope.

In order for the light emitted from the light source (20) to proceed to the light radiating part (11) through the light guiding part (15), the third reflection point (the point "r" for the ray no. 1, the point "r'" for the ray no. 2, and the point "r''" for the ray no. 3) should be positioned on the surface of the light radiating part (11). As in the ray no. 1, however, if the third reflection point "r" is not positioned on the surface of the light radiating part (11), the light does not proceed through the panel (10), but is refracted or reflected to undesired directions.

Therefore, since the third reflection point of the ray no. 2 is located at the point D at which the light guiding part (15) and the light radiating part (11) meet, the maximum thickness (T') of the light guiding part (15) must be the height of the ray no. 2 at which the light is emitted from the light source (20).

Referring to FIG. 9(b), the maximum thickness (T') of the light guiding part (15) can be calculated from the angle of inclination (h) of the light guiding part (15) and the thickness (T) of the light radiating part (11) as follows:

The width (w) of the light guiding part (15) is $$w = w_1 + w_2 \quad (1)$$

In the right triangle ΔCDH, $$w_1 \times \tan 2h = T,$$

$$w_1 = T \times \cot 2h \quad (2)$$

Setting up a coordinate plane with an χ axis of the straight line $\overline{GH}$ and with the starting point C (0,0), $w_2$ can be obtained from functions for the straight lines $\overline{CE}$ and $\overline{DE}$:

$$\overline{CE}: f_1(\chi) = -\tan 2h \times \chi$$

$$\overline{DE}: f_2(\chi) = -\tan h \times (\chi - w_1) + T$$

The coordinate χ is $$\chi = \frac{-w_1 x \tan h - T}{\tan 2h - \tan h} \quad (3)$$

and thus, $w_2 = |\chi| = \frac{w_1 x \tan h + T}{\tan 2h - \tan h}$ if incorporating ② and ③ into ①, $$w = T \cot 2h + \frac{\cot 2h \times \tan h + 1}{\tan 2h - \tan h} \times T$$

Therefore, $T' = \overline{EG}$ $$= \overline{EF} + \overline{FG}$$

$$= w \times \tan h + T$$

$$= \left(1 + \cot 2h \times \tan h + \frac{\cot 2h \, \tan^2 h + \tan h}{\tan 2h - \tan h}\right) \times T$$

If the fractions are reduced to a common denominator and arranged, $$T' = \left(\frac{2 \tan h}{\tan 2h - \tan h} + 1\right) \times T$$

If h=24° and T=8 mm,
T' should be 18.7 mm or less.
Also, if h=18° and T=8 mm,
then T' should be 20.9 mm or less.
That is, as the value ∠h becomes smaller, the width (T') of the front end of the light guiding part (15) becomes wider.

Secondly, as shown in FIGS. 9(c) and (d), it is assumed that the light guiding part (15) has slopes on both sides.

In order for the light emitted from the light source (20) to proceed to the light radiating part (11) through the light guiding part (15), the second reflection point (the point "t" for the ray no. 1, the point "t'" for the ray no. 2, the point "t''" for the ray no. 3, and the point "t'''" for the ray no. 4) should be positioned on the surface of the light radiating part (11). As in the ray no. 1, however, if the second reflection point "t" is not positioned on the surface of the light radiating part (11), the light does not proceed through the panel (10), but is refracted or reflected to undesired directions.

Therefore, since the second reflection points of the ray nos. 2 and 4 are located at the points I and J, respectively, at which the light guiding part (15) meets with the light radiating part (11), the maximum thickness (T") of the light guiding part (15) would be the width between the ray no. 2 and the ray no. 4.

Referring to FIG. 9(d), the maximum thickness (T") of the light guiding part (15) can be calculated from the angle of inclination (h) of the light guiding part (15) and the thickness (T) of the light radiating part (11) as follows:

Setting up a coordinate plane with an $\chi$ axis of the straight line $\overline{HJ}$ and with the starting point J (0,0), "z" can be obtained from functions for the straight lines $\overline{KI}$ and $\overline{KJ}$:

$\overline{KI}: f_3(\chi) = -\tan h \times \chi + T$ $\overline{KJ}: f_4(\chi) = -\tan 2h \times \chi$ The coordinate $\chi$ is $$\chi = \frac{-T}{\tan 2h - \tan h}$$

$$z = |\chi| = \frac{T}{\tan 2h - \tan h}$$

Therefore, $T'' = \overline{KL} + \overline{LM} + \overline{MN}$ $= z \times \tan h + T + z \times \tan h$ $= 2 \times z \times \tan h + T$ $= \left(\frac{2\tan h}{\tan 2h - \tan h} + 1\right) \times T$ Consequently, the value of T" is the same as the value of the above T' for which the slope is formed in only one side of the light guiding part (15). This means that the maximum thickness of the light guiding part (15) can be chosen from any of the above light guiding parts (15).

FIGS. 10(a) to (d) are partial sectional views of various embodiments according to the present invention.

Figure 10:
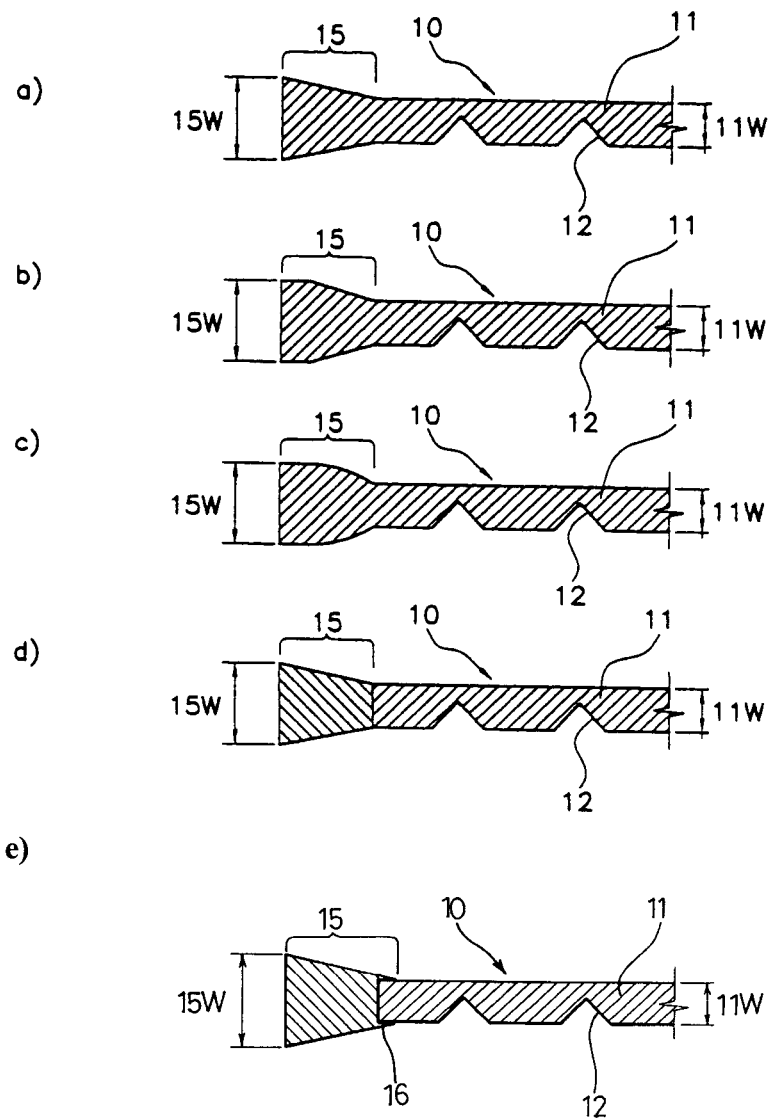
FIGS. 10(a) to (d) are partial sectional views of embodiments according to the present invention.
Figure 11:
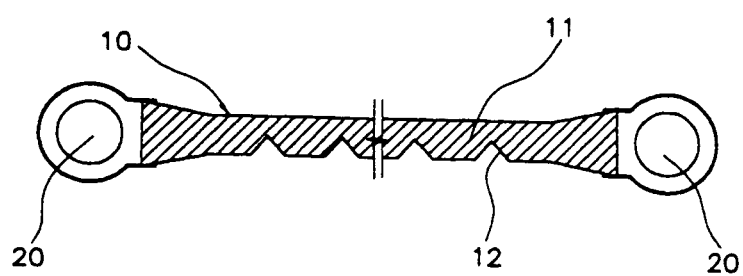
FIG. 11 is a partial sectional view according to a further embodiment of the present invention.

The light guiding part (15) can be formed to be oblique lines as shown in FIG. 10(a), and can be formed to be the combination of oblique lines and straight lines as in FIG. 10(b). Also, it can be formed to be the combination of straight lines, oblique lines and curved lines as shown in FIG. 10(c).

As in FIG. 10(d), the light guiding part (15) can be formed separately from the light radiating part (11).

The light guiding part (15) and the light radiating part (11) can be made from different materials.

In addition, as in FIG. 10(e), the light guiding part (15) can be provided with a recessed fitting part (16) at one end to facilitate the connection with the light radiating part (11).

When the light source (20) is provided at only one side of the light guide panel (10), the light guiding part (15) is only provided between the light source (20) and one end of the light radiating part (11). Further, when two light sources (20) are provided at both sides of the light guide panel (10), it is preferable that two light guiding parts (15) are provided at both ends of the light radiating part (11).

In the present invention, the slanted light guiding part (15) forms a slope ($\theta_1$) to the extent that its one end adjacent to the light source (20) is thick enough to cover the diameter (20W) of the light source (20) in order to maximize the absorption of the light and is thicker than the other end adjacent to the light radiating part (11). The light guiding part (15) is inclined in the slope ($\theta_1$) so that the light emitted from the light source (20) can be totally reflected. With this structure, the light radiating part (11) which mainly constitutes the light guide panel (10) can be formed thin to have the thickness (11W), and the brightness can be maximized, while the weight and volume of the light guide panel (10) can be significantly reduced.

Further, with this structure, although the light guiding part (15) is inclined to be thinner and thinner as it approaches to the light radiating part (11), due to the total internal reflection, the brightness can be the same as in the case where the light radiating part (11) is as thick as the front end (15W) of the light guiding part (15).

Accordingly, by the reduction of the volume and weight of the light radiating part (11) which mainly constitutes the light guide panel (10), the demand for raw materials of the light guide panel (10) can be reduced such that the manufacturing cost can be saved and it becomes easy to handle and install the backlight units including the light guide panel (10).

The present invention is especially useful in the installation of large-sized backlight units.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. A light guide panel comprising:
   a light radiating part to radiate the light emitted from a light source from a front side of the light guide panel; and
   one or more slanted light guiding parts provided between the light source and one side end of the light radiating part, wherein the one or more slanted light guiding parts comprises a medium having an optical density greater than air, wherein light from the light source enters the medium and is guided to the light radiating part, wherein the one or more slanted light guiding parts form a slope to the extent that one end of the one or more slanted light guiding parts adjacent to the light source is thicker than the other end adjacent to the light radiating part, wherein the one or more light guiding parts are provided with a recessed fitting part at one end to facilitate the connection with the light radiating part so that the recessed fitting part contacts the side end of the light radiating part when connected.

2. The light guide panel as claimed in claim 1, wherein the slope of the one or more light guiding parts are below a critical angle according to an index of refraction of each medium.

3. The light guide panel as claimed in claim 1, wherein the one or more light guiding parts are formed to be the combination of straight lines, oblique lines and curved lines.

4. The light guide panel as claimed in claim 1, wherein the one or more light guiding parts are separately formed from the light radiating part.

5. The light guide panel as claimed in claim 1 wherein the one or more light guiding parts and the light radiating part are made from different materials.

6. The light guide panel as claimed in claim 4, wherein the one or more light guiding parts and the light radiating part are made from different materials.

7. A light guide panel comprising:
   a light radiating part to radiate the light emitted from a light source from a front side of the light guide panel; and
   a slanted light guiding part provided between the light source and one side end of the light radiating part, wherein the slanted light guiding part comprises a medium having an optical density greater than air, wherein light from the light source enters the medium and is guided to the light radiating part, wherein the slanted light guiding part forms only one side slope to the extent that one end of the slanted light guiding part adjacent to the light source is thicker than the other end adjacent to the light radiating part.

8. The light guide panel as claimed in claim 7, wherein the slope of the light guiding part is below a critical angle according to an index of refraction of each medium.

9. The light guide panel as claimed in claim 7, wherein the light guiding part is formed to be the combination of straight lines, oblique lines and curved lines.

10. The light guide panel as claimed in claim 7, wherein the light guiding part is provided with a recessed fitting part at one end to facilitate the connection with the light radiating part so that the recessed fitting part contacts the side end of the light radiating part when connected.

11. The light guide panel as claimed in claim 7, wherein the light guiding part and the light radiating part are made from different materials.

12. The light guide panel as claimed in claim 7, wherein the light guiding part is separately formed from the light radiating part.

13. The light guide panel as claimed in claim 12, wherein the light guiding part and the light radiating part are made from different materials.

* * * * *